United States Patent
Watson et al.

(10) Patent No.: US 6,979,457 B2
(45) Date of Patent: Dec. 27, 2005

(54) FOOD SUPPLEMENT FORMULATION

(75) Inventors: Tommy Stanley Watson, Dunedin, FL (US); Brenda F. Watson, Dunedin, FL (US)

(73) Assignee: Renew Life Formulas, Inc., Clearwater, FL (US)

( * ) Notice: Subject to any disclaimer, the term of this patent is extended or adjusted under 35 U.S.C. 154(b) by 744 days.

(21) Appl. No.: 10/034,551

(22) Filed: Dec. 28, 2001

(65) Prior Publication Data

US 2003/0124240 A1   Jul. 3, 2003

(51) Int. Cl.⁷ .................. A23K 1/165; A23K 1/17; A61K 47/00
(52) U.S. Cl. .............. 424/439; 424/442; 424/643
(58) Field of Search ................ 424/439, 442, 424/643

(56) References Cited

U.S. PATENT DOCUMENTS

| | | | |
|---|---|---|---|
| 5,747,434 A * | 5/1998 | Lamsa et al. | 508/485 |
| 6,077,828 A * | 6/2000 | Abbruzzese et al. | 514/21 |
| 6,228,367 B1 * | 5/2001 | Watson | 424/768 |

* cited by examiner

*Primary Examiner*—Thurman K. Page
*Assistant Examiner*—Sharon Howard
(74) *Attorney, Agent, or Firm*—Fraser Martin Buchanan Miller LLC; Donald R. Fraser

(57) ABSTRACT

A food supplement formulation consists essentially of flaxseed oil and lipase.

9 Claims, No Drawings

FOOD SUPPLEMENT FORMULATION

FIELD OF THE INVENTION

The present invention relates generally to a food supplement formulation. More particularly, the invention is directed to a food supplement formulation containing omega-3 essential fatty acids which are important for maintaining good health.

BACKGROUND OF THE INVENTION

Natural compounds and herbal formulations can provide a supplement to the daily human diet. Certain compounds are useful to the human body, but are not produced in substantial quantities thereby. Thus, formulations made from natural products have been found useful for supplementing the intake of these compounds for the human diet.

It would be desirable to prepare a food supplement formulation which may be taken in addition to the daily human diet, which food supplement formulation may promote good health.

SUMMARY OF THE INVENTION

Accordant with the present invention, there surprisingly has been discovered a food supplement formulation, consisting essentially of:
flaxseed oil; and
lipase.

The food supplement formulation according to the present invention is useful as a dietary supplement.

DETAILED DESCRIPTION OF THE PREFERRED EMBODIMENT

The present invention is directed to a food supplement formulation, consisting essentially of flaxseed oil and lipase. The inventive formulation may be mixed together in conventional mixing equipment, and thereafter inserted into dosage-sized gelatin capsules for oral administration.

Flaxseed oil is a well-known compound containing omega-3 and omega-6 essential fatty acids in the forms of alpha-linolenic acid and linoleic acid. The body converts these fatty acids into other important fatty acids, which are used by the body for the production of prostaglandins. Prostaglandins are then used by the body to maintain healthy cholesterol and blood fat levels, support healthy blood pressure levels, and protect the membranes that surround the body's nerves.

Flaxseed oil may be present in the inventive food supplement formulation at a concentration from about 97.0 weight percent to about 99.9 weight percent. Preferably, the concentration of flaxseed oil is about 99.5 weight percent.

Lipase is a well-known compound, consisting of enzymes that help the body's digestive system break down and digest fats, cellulose, carbohydrates, and proteins. Lipase enzymes are produced by the body's liver and pancreas. In a substantial number of people, however, the production of lipase enzymes is deficient. Lipase may also be obtained from plants, and thereby used to supplement the body's production.

Lipase may be present in the inventive food supplement formulation at a concentration from about 0.1 weight percent to about 3 weight percent. Preferably, the concentration of lipase is about 0.5 weight percent.

Flaxseed oil and lipase have been combined with other natural and herbal ingredients in prior art formulations, for generally promoting good health. It has now surprisingly been discovered that flaxseed oil and lipase alone synergistically work together to promote series 3 prosteglandins, which are reportedly useful in reducing instances of stroke, heart attack, and certain inflammatory diseases.

The ingredients of the inventive food supplement formulation synergistically work together to improve bodily functions such as, for example, cardiovascular function, joint flexibility, fat metabolism, nervous system and brain function, hormone production, and cell division.

Conveniently, the inventive food supplement formulation may be taken orally at a dosage rate ranging from about 200 milligrams per day to about 2,000 milligrams per day. Preferably, the dosage rate is about 1,000 milligrams per day. The prescribed dosage rates are effective to supplement the lack of important compounds required by the body to achieve and maintain good health.

This invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A food supplement formulation, consisting essentially of:
   flaxseed oil; and
   lipase.

2. The food supplement formulation according to claim 1, wherein the concentration of flaxseed oil ranges from about 97.0 weight percent to about 99.9 weight percent.

3. The food supplement formulation according to claim 1, wherein the concentration of lipase ranges from about 0.1 weight percent to about 3.0 weight percent.

4. The food supplement formulation according to claim 2, wherein the concentration of flaxseed oil is about 99.5 weight percent.

5. The food supplement formulation according to claim 3, wherein the concentration of lipase is about 0.5 weight percent.

6. A food supplement formulation, consisting essentially of:
   from about 97.0 weight percent to about 99.9 weight percent flaxseed oil; and
   from about 0.1 weight percent to about 3.0 weight percent lipase.

7. The food supplement formulation according to claim 6, wherein the concentration of flaxseed oil is about 99.5 weight percent.

8. The food supplement formulation according to claim 6, wherein the concentration of lipase is about 0.5 weight percent.

9. A food supplement formulation, consisting essentially of:
   about 99.5 weight percent flaxseed oil; and
   about 0.5 weight percent lipase.

* * * * *